3,067,202
PRODUCTION OF PIPERAZINES
John T. Patton, Jr., and William W. Levis, Jr., Wyandotte, and William K. Langdon, Grosse Ile, Mich., assignors to Wyandotte Chemicals Corporation, Wyandotte, Mich., a corporation of Michigan
No Drawing. Filed Nov. 27, 1957, Ser. No. 699,155
8 Claims. (Cl. 260—268)

This invention relates to the production of new diamines, that is, diamines which have been known in the laboratory, but which have not been commercially available. In a more specific aspect, this invention relates to a new and improved process for the production of new diamines with sufficiently high conversions and yields so that commercial production of these compounds is practical.

As far as we are aware, the only reported work which is at all related to our process is disclosed in a note by Rene Guillaumin in Compt. rend., 234, pages 2076–2077 (1952) and a subsequent note by the same author in Compt. rend., 236, pages 1270–1271 (1953) disclosing the preparation of tetramethylpyrazine. Guillaumin discloses that tetramethylpyrazine was obtained by condensing 2,3-butanediol and ammonia over a dehydration catalyst, i.e., silica gel or alumina, in vapor phase at about 400° C. It is noted that a maximum yield of 9.5% of tetramethylpyrazine was obtained. No mention is made of the formation of tetramethylpiperazine or any other diamine and, obviously, a process which provides a yield of only 9.5% is not likely to be adequate as the basis for a commercial process.

An object of this invention is, therefore, to provide a new and improved process for the production of new diamines.

A further object is to provide a method for the production of new diamines with sufficiently high conversions and yields as to make commercial operations based on the process practical.

In contrast to the teachings of Guillaumin referred to above, we have found that, with the proper choice of reaction conditions and catalyst, a vicinal glycol, such as 2,3-butanediol (2,3-butylene glycol) can be reacted with a vicinal diamine, such as ethylenediamine or 1,2-propylenediamine, to produce new alkyl-substituted piperazines. Our process permits the production of many essentially new piperazine compounds since any vicinal glycol of reasonable molecular weight having a pair of secondary hydroxyl radicals can be reacted with any vicinal diamine of reasonable molecular weight and high conversions to new diamine compounds are obtained under the conditions of our process.

Our new process, in contrast to the disclosure of Guillaumin referred to above, is a liquid phase process employing either a nickel or a cobalt hydrogenation/dehydrogenation catalyst. In further contrast to the teachings of Guillaumin, we employ much lower temperatures, our temperatures generally falling in the range of 125 to 275° C. Thus, our process comprises heating a vicinal glycol and a vicinal diamine under at least sufficient pressure to maintain the glycol reactant in liquid phase in the presence of a nickel or cobalt hydrogenation/dehydrogenation catalyst.

The glycol reactant employed in our process is a vicinal glycol having a pair of secondary hydroxyl radicals. Thus, the glycol reactant can be represented by the formula $$R-\underset{OH}{\underset{|}{C}}H-\underset{OH}{\underset{|}{C}}H-R'$$

wherein R and R' are alkyl radicals. R and R' can also collectively constitute a polymethylene radical having 3–6, inclusive, carbon atoms. Where both R and R' are methyl radicals, the glycol reactant is 2,3-butylene glycol which, because of its present availability, is preferred for use in the process of our invention. Usually, R and R' are lower alkyl radicals but, since our process is a liquid phase process and thus does not require the vaporization of reactants, any vicinal glycol corresponding to the above formula wherein R and R' are alkyl groups having up to as many as about 18 carbon atoms each can be used. Where R and R' collectively constitute a polymethylene radical, such as trimethylene, tetramethylene or hexamethylene radicals, the vicinal glycol reactants are 1,2-cyclopentanediol, 1,2-cyclohexanediol and 1,2-cyclooctanediol. Vicinal glycols to be used in the process of the invention can be prepared by hydroxylation of corresponding mono-unsaturated aliphatic or cycloaliphatic hydrocarbons. Examples of other vicinal glycols which can be used include 2,3-butanediol (2,3-butylene glycol), 2,3-pentanediol, 2,3-hexanediol, 3,4-hexanediol, 3,4-heptanediol, 2,3-octanediol, 4,5-octanediol, 2,3-nonanediol, 3,4-nonanediol, 2,3-dodecanediol, 2,3-hexadecanediol, 2,3-octadecanediol, 2,3-eicosanediol, 9,10-eicosanediol, 9,10-tetracosanediol, 2,3-triacontanediol, 2,3-hexatriacontanediol and the like.

The glycol reactant is heated and stirred with a vicinal diamine which corresponds to the formula $$R-\underset{NH_2}{\underset{|}{C}}H-\underset{NH_2}{\underset{|}{C}}H-R'$$

wherein R and R' are hydrogen or alkyl radicals having up to 18 carbon atoms. R and R' can also collectively constitute a polymethylene radical having 3–6, inclusive, carbon atoms. The amine radicals need not necessarily be attached to secondary carbon atoms as is true in the case of the vicinal glycol reactant. Thus, we have successfully employed ethylenediamine and 1,2-propylenediamine as reactants in our process. When ethylenediamine was reacted with 2,3-butylene glycol in accordance with our process, we obtained a conversion of 46% to 2,3-dimethylpiperazine. When 1,2-propylenediamine was employed in the process of the invention, we obtained a conversion of 42% to 2,3,5-trimethylpiperazine. 2,3-dimethylpiperazine and 2,3,5-trimethylpiperazine are diamines which have not been produced on a commercial scale heretofore.

R and R' in the formula above for the vicinal diamine reactant are usually lower alkyl radicals, although as stated, R and R' can each have up to about 18 carbon atoms. Thus, examples of vicinal diamines which can be used as the aminating agent include ethylenediamine, 1,2-propylenediamine, 1,2-butylenediamine, 2,3-butylenediamine, 1,2-diaminopentane, 1,2-diaminohexane, 3,4-diaminoheptane, 1 2-diaminononane, 1,2-diaminododecane, 3,4-diaminohexadecane, 5,6-diaminoeicosane, 1,2-diaminohexacosane, 7,8-diaminohexacosane, 1,2-diaminotriacontane, 1,2-diaminodotriacontane, 15,16-diaminohexatriacontane and the like. Where R and R' collectively constitute a polymethylene radical, the vicinal diamine reactants that can be used include 1,2-diaminocyclopentane, 1,2-diaminocyclohexane, 1,2-diaminocyclooctane and the like. The fact that our process is liquid phase process permits the use of relatively large reactant molecules and the production of the corresponding substituted piperazine or alkylene diamine products since the reactants are not vaporized and no problems of cracking or dehydrogenation are presented such as are present in high-temperature vapor phase processes such as that disclosed by Guillaumin referred to above.

Examples of substituted piperazine and alkylene diamine products which can be obtained by our process thus include 2,3-dimethylpiperazine, 2,3,5-trimethylpiperazine, 2,3,5,6-tetramethylpiperazine, 2,3 - diethyl-5,6-dimethylpiperazine, 2,3-dihexyl-5,6-dipropylpiperazine, 2,3 5,6-tetraoctylpiperazine, 2,3,5,6-tetranonylpiperazine, 2-butyl-3-hexyl-5-heptyl-6-octylpiperazine, and the like.

It will be noted from the above stated examples of substituted piperazines that the expression "alkyl-substituted" piperazines employed in this specification is not coextensive in scope with the scope of substituted piperazine products that can be produced by our process. The expression "alkyl-substituted" piperazines is employed herein for convenience and is not intended to limit the scope of our process as defined herein and which includes the use of vicinal diamine and vicinal glycol reactants having cycloaliphatic hydrocarbon radical substitutents thereon.

Our process is a liquid phase process and it is usually carried out under superatmospheric pressure. The pressure can be the autogenous pressure of the reactants in a closed vessel and can range up to about 3000 p.s.i.g. or higher. The pressure can be established by adding hydrogen gas to the reactants and we generally prefer that the pressure fall in the range of 500 to 3000 p.s.i.g. Our highest conversions have been obtained when the pressure was about 1200 p.s.i.g.

As noted above, hydrogen can be employed by adding it to the reactants at the start of the reaction in order that a desired pressure is obtained during the reaction. Hydrogen is not required, however, in order to obtain high conversions of the new diamine products. Hydrogen does have an effect in suppressing the formation of byproducts, such as pyrazines, and is believed to aid in the maintenance of the catalyst activity.

The reactants are normally employed in anhydrous condition but aqueous dispersions of the reactants can be employed. Water is a product of the process and additional water can be added to the reactants in order to reduce the vapor pressure of the reactants where this is desirable.

The liquid phase process of this invention can be carried out continuously, wherein the reactants are passed in liquid phase over a nickel or cobalt hydrogenation/dehydrogenation catalyst, or can be carried out as a batch process. Our work has been done in batch processes wherein the reactants were heated and stirred in an autoclave. When the process is carried out as a batch process, the reaction time generally falls in the range of from 2 to about 15 hours. We find that the highest conversions are obtained when the reactants are heated and stirred for about 6 to 12 hours and our best results were obtained when the reactants were heated and stirred about 10 hours.

The temperature employed falls in the range of 125 to 275° C. Our preferred conditions are a temperature in the range of about 200 to 250° C. and a molar ratio of about 1 to 2 mols of aminating agent per mol of vicinal glycol.

The optimum conditions that we have found for the production of alkyl-substituted piperazines in our process are a temperature of about 220° C. and a molar ratio of about 1.25 mols aminating agent to 1 mol of vicinal glycol.

It is to be noted, however, that high conversions to alkyl-substituted piperazines can be obtained in our process when less than a 1:1 mol ratio of aminating agent to glycol is used, although yields are thereby limited by the amount of aminating agent used.

The high conversions and yields of alkyl-substituted piperazines which are obtained in the process of this invention are obtained by using a nickel or cobalt hydrogenation/dehydrogenation catalyst. Alloy skeletal nickel and alloyl skeletal cobalt catalysts have been found to be particularly effective when the method of the invention is carried out as a batch process. Supported nickel or cobalt hydrogenation/dehydrogenation catalysts can also be used when the process of the invention is carried out continuously. Such supported catalysts as the commercially available nickel supported on kieselguhr hydrogenation/dehydrogenation catalysts can be used. Other support materials such as silica gel, pumice, and the like can also be used in the supported nickel or cobalt catalysts.

Alloy skeletal nickel or cobalt catalysts can be prepared by dissolving aluminum from finely divided nickel-aluminum or cobalt-aluminum alloys, respectively. Supported nickel and cobalt catalysts are commonly prepared by suspending a finely divided inert catalyst support in an aqueous solution of a salt of the nickel or cobalt. Sodium carbonate is then added to provide an insoluble nickel or cobalt carbonate. The resulting slurry is then filtered and thoroughly washed with water to remove all sulfate or chloride ions and dried. The powdered mixture of carbonate and catalyst support is then mixed with a lubricant and a binder, pressed into pellets or other desired physical form. For an excellent review of the preparation of nickel and cobalt catalysts of the type that can be employed in our process, see "Catalysis" by Berkman et al., Reinhold Publishing Company, 330 West 42nd Street, New York City, pages 253–265, 1940 edition.

It is believed that the reaction of a vicinal glycol with a vicinal diamine in the process of this invention takes place on the surface of the nickel or cobalt hydrogenation/dehydrogenation catalyst and therefore the catalyst concentration or the contact time between the reactants and the catalyst bed have little or no effect on the over-all yield, but only on the reaction rate. The catalyst concentration, or contact time where the process is carried out continuously, can be varied over wide ranges with proper adjustment of temperature and pressure as disclosed herein and high conversions and yields of the desired alkyl-substituted piperazines are obtained.

When the method of this invention is carried out as a batch process, a catalyst concentration of about 1 to 5 grams of alloy skeletal nickel or cobalt catalyst per mol of vicinal glycol starting material is effective in the process. The amount of catalyst indicated is stated on a "dry basis," taking into account the amount of water present in an alloy skeletal nickel or cobalt catalyst which is about 50% water. Generally, our highest conversions were obtained in a batch process employing alloy skeletal nickel catalyst with about 2 to 4 grams of the catalyst per mol of the vicinal glycol starting material. The weight of catalyst set forth in the examples reported hereinafter is the actual weight of catalyst as used (drained of excess water), and is on a "wet basis."

The products of the process of the invention include the alkyl-substituted piperazine main products and also include alkyl-substituted pyrazines and unreacted vicinal glycol starting material. The alkyl-substituted piperazine products form a complex with the vicinal glycol starting material which makes it difficult to recover the alkyl-substituted piperazine product in a pure form from the crude reaction product by simple distillation. However, the alkyl-substituted piperazine product can be separated from the complex with the unreacted glycol reactant by azeotropic distillation with a hydrocarbon azeotroping agent, such as xylene or cumene.

The terms "yield" and "conversion" are employed in this specification. The conversion is a measure of the percent of the vicinal glycol starting material that is converted to the alkyl-substituted piperazine product. Conversion is calculated in accordance with the equation:

Percent conversion to a product $$= \frac{(\text{Mols product obtained}) \times (100)}{(\text{Theoretical mols of product from vacinal glycol charged})}$$

Yield is calculated on the basis of the vicinal glycol starting material which is actually consumed in the reaction of the invention in accordance with the equation:

Percent yield of a product
$$= \frac{(\text{Mols product obtained}) \times (100)}{(\text{Theoretical mols of product from vacinal glycol consumed})}$$

The following examples are set forth to illustrate the method of the invention and should not be used to unduly restrict the scope of the invention as it has been described and claimed herein.

The manipulative steps employed in the reactions set forth were generally the same in all of the examples. Weighed amounts of the vicinal glycol, 2,3-butylene glycol, and catalyst, Raney nickel drained of excess water, were charged into an autoclave. The autoclave used in Example 1 was a one-gallon, electrically heated, stirred autoclave. The autoclave was then purged of air by pressuring twice with nitrogen. A vicinal diamine, such as ethylenediamine or 1,2-propylenediamine, was weighed into the autoclave. The reactions were either carried out under autogenous pressure or hydrogen was added to maintain a desired pressure. The reactants were then heated with stirring to the desired temperature and this temperature was maintained throughout the reaction time. The reaction products were then cooled to room temperature, the autoclave was vented slowly and a known amount of water was added to the reaction products. The crude reaction product containing the added water was then heated with agitation to 80° C. for one-half hour and the crude reaction mass then discharged from the autoclave. The catalyst was filtered from the reaction product and the reaction product was then fractionally distilled.

The crude reaction product was distilled in a 120 x 2.8 centimeter glass helix-packed column using a partial take-off head and water condenser except where otherwise stated. The distillation was continued until the overhead product began to separated into two phases. Substituted pyrazine by-products were then removed as an oil using a top-decanter head, following which water was removed by further distillation. Unreacted glycol was removed as an azeotrope with cumene using a water-cooled bottom-decanter head. Cumene was then removed as an azeotrope with water using a top-decanter head. The remaining water was then removed by further distillation from the crude reaction product. The substituted piperazine product was then collected and the percentage content of substituted piperazine product was determined by titration.

*Example 1*

2,3-dimethylpiperazine was produced by reacting 2,3-butylene glycol with ethylenediamine at 220° C. and 1200 p.s.i.g. in the presence of a Raney nickel catalyst. The one-gallon autoclave was charged with 691 grams (10.0 mols) of 86.8% aqueous ethylenediamine, 900 grams (10.0 mols) of 2,3-butylene glycol and 100 grams of wet Raney nickel catalyst. Hydrogen gas was charged so as to impose an initial pressure of 50 p.s.i.g. on the reactants and the reaction mixture was then heated to 220° C. for six hours with agitation. A reaction pressure of 1200 p.s.i.g. was maintained by occasional venting during the reaction period.

There was obtained a conversion of 46.2% to 2,3-dimethylpiperazine. Based on the weight of 2,3-butylene glycol consumed in the reaction, there was a 57% yield to 2,3-dimethylpiperazine.

*Example 2*

2,3,5-trimethylpiperazine was prepared by reacting 2,3-butylene glycol with 1,2-propylenediamine. 900 grams (10.0 mols) of 2,3-butylene glycol, 740 grams (10.0 mols) of 1,2-propylenediamine and 100 grams of wet Raney nickel catalyst were charged to the one-gallon autoclave. After purging the autoclave with nitrogen, an initial pressure of 50 p.s.i.g. was established with hydrogen gas and the reactants were heated to 220° C. with stirring for eight hours. The products of the reaction were analyzed by the procedure described hereinabove.

A conversion of 42% to 2,3,5-trimethylpiperazine was obtained.

The remarkable facility and ease by which substituted piperazines are produced by the method of this invention should be amply demonstrated by the foregoing examples.

Broadly speaking, our invention comprises, therefore, heating a vicinal glycol of the type defined hereinabove with a defined vicinal diamine to a temperature in the range of 125 to 275° C. in the presence of a nickel or cobalt hydrogenation/dehydrogenation catalyst and under at least sufficient pressure to maintain the vicinal glycol in liquid phase.

We claim:
1. A process which comprises, heating to a temperature of 125 to 275° C. a subsequently defined vicinal glycol and a subsequently defined vicinal diamine, said heating being carried out under at least sufficient pressure so as to maintain the vicinal glycol reactant in liquid phase and in the presence of a catalyst selected from the group consisting of nickel and cobalt hydrogenation/dehydrogenation catalysts, said vicinal glycol being selected from the group consisting of glycols corresponding to the formula

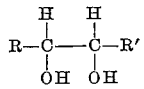

wherein R and R' are members selected from the group consisting of alkyl radicals having up to about 18 carbon atoms and R and R' collectively constituting a polymethylene radical having 3–6, inclusive, carbon atoms, and said vicinal diamine being selected from the group consisting of diamines corresponding to the formula

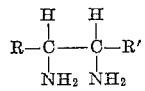

wherein R and R' are members selected from the group consisting of hydrogen, alkyl radicals having up to 18 carbon atoms and R and R' collectively constituting a polymethylene radical having 3–6, inclusive, carbon atoms.

2. A process according to claim 1 wherein said vicinal glycol is 2,3-butylene glycol and wherein said aminating agent is ethylenediamine.

3. A process according to claim 1 wherein said vicinal glycol is 2,3-butylene glycol and wherein said aminating agent is 1,2-propylenediamine.

4. A process according to claim 1 wherein said vicinal glycol is 2,3-butylene glycol and wherein said aminating agent is 1,2-butylenediamine.

5. A process according to claim 1 wherein said vicinal glycol is 2,3-butylene glycol and wherein said aminating agent is 2,3-butylenediamine.

6. A process which comprises, heating to a temperature of 125 to 275° C. a subsequently defined vicinal glycol, hydrogen and a subsequently defined vicinal diamine, the amount of hydrogen being controlled so that the pressure during the process is at least sufficient so as to maintain the vicinal glycol reactant in liquid phase, said heating being carried out in the presence of a catalyst selected from the group consisting of nickel and cobalt hydrogenation/dehydrogenation catalysts, said vicinal glycol being selected from the group consisting of glycols corresponding to the formula

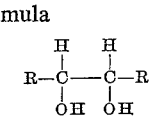

wherein R and R' are members selected from the group consisting of alkyl radicals having up to about 18 carbon atoms and R and R' collectively constituting a polymethylene radical having 3–6, inclusive, carbon atoms, and said vicinal diamine being selected from the group consisting of diamines corresponding to the formula

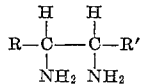

wherein R and R' are members selected from the group consistting of hydrogen, alkyl radicals having up to 18 carbon atoms and R and R' collectively constituting a polymethylene radical having 3–6, inclusive, carbon atoms.

7. A process according to claim 6 wherein said pressure is from 500 to 3000 p.s.i.g.

8. A process for preparing alkyl piperazines which comprises reacting in the liquid phase, hydrogen, a glycol of the formula:

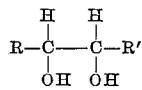

wherein R and R' are lower alkyl radicals with a vicinal diamine of the formula

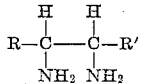

wherein R and R' are selected from the group consisting of lower alkyl radicals and hydrogen within the temperature range of 200° C. to 275° C. and under a superatmospheric pressure in excess of about 30 atmospheres and a catalyst of the class consisting of nickel and cobalt hydrogenation catalysts.

References Cited in the file of this patent
UNITED STATES PATENTS

| | | |
|---|---|---|
| 2,412,209 | Dickey | Dec. 10, 1946 |
| 2,519,560 | Fowler | Aug. 22, 1950 |
| 2,754,330 | Shreyer | July 10, 1956 |

OTHER REFERENCES

Whitmore: Organic Chemistry, pages 302–315 (1951).

Guillaumin: Academie Des Sciences Comptes Rendus, vol. 234, pp. 2076–2077 (1952).

Guillaumin: Academie Des Sciences Comptes Rendus, vol 236, pp. 1270–1271 (1953).